(12) United States Patent
Fernandes et al.

(10) Patent No.: US 11,422,038 B2
(45) Date of Patent: Aug. 23, 2022

(54) SYSTEM FOR MEASURING THE TEMPERATURE OF A FLUID CIRCULATING IN A DUCT

(71) Applicant: AKWEL SA, Champfromier (FR)

(72) Inventors: Thomas Fernandes, Montpellier (FR); Jérémy Dreux, Meriel (FR); Olivier Pujol, Avignon (FR)

(73) Assignee: AKWEL SA, Champfromier (FR)

( * ) Notice: Subject to any disclaimer, the term of this patent is extended or adjusted under 35 U.S.C. 154(b) by 500 days.

(21) Appl. No.: 16/272,160

(22) Filed: Feb. 11, 2019

(65) Prior Publication Data

US 2019/0265109 A1 Aug. 29, 2019

(30) Foreign Application Priority Data

Feb. 27, 2018 (FR) ..................................... 18/70210

(51) Int. Cl.
| | | |
|---|---|---|
| *G01K 1/00* | (2006.01) | |
| *G01K 7/00* | (2006.01) | |
| *G01K 13/00* | (2021.01) | |
| *G01K 1/14* | (2021.01) | |
| *G01K 7/22* | (2006.01) | |
| *G01K 13/02* | (2021.01) | |
| *G01K 13/024* | (2021.01) | |

(52) U.S. Cl.
CPC ................. *G01K 1/14* (2013.01); *G01K 7/22* (2013.01); *G01K 13/02* (2013.01); *G01K 13/024* (2021.01)

(58) Field of Classification Search
CPC ........ G01K 1/14; G01K 13/026; G01K 13/02; G01K 13/024

USPC ................................. 374/148, 208, 183, 144
See application file for complete search history.

(56) References Cited

U.S. PATENT DOCUMENTS

| | | | | |
|---|---|---|---|---|
| 3,526,134 | A | 9/1970 | Paine | |
| 2008/0205481 | A1* | 8/2008 | Faries | A61M 5/445 374/138 |
| 2009/0323761 | A1* | 12/2009 | Tsai | G01K 13/02 374/148 |
| 2011/0243186 | A1* | 10/2011 | Brautigam | F16L 41/008 374/148 |

(Continued)

FOREIGN PATENT DOCUMENTS

| | | |
|---|---|---|
| CN | 202814749 U | 3/2013 |
| DE | 3508570 A1 | 9/1985 |

(Continued)

*Primary Examiner* — Mirellys Jagan
(74) *Attorney, Agent, or Firm* — Oliff PLC (57) ABSTRACT

The system includes a thermal probe with a heat-sensitive element, a fluid-tight plunger body, shaped to completely wrap the heat-sensitive element of the probe, a probe support including two orifices for joining the system to the duct, linked by an inner channel substantially axially extending in a main flow direction of the fluid in the support and including a radial opening through which the plunger body is configured to be at least partially submerged inside the inner channel. More particularly, the inner channel is delimited by a tubular wall having an inner surface with a depression located facing the opening in order to limit singular pressure losses of the fluid likely to be generated by the presence of the plunger body in the fluid by defining a flow pathway of the fluid around the plunger body.

19 Claims, 5 Drawing Sheets

(56) References Cited

U.S. PATENT DOCUMENTS

| | | | | |
|---|---|---|---|---|
| 2012/0128029 A1* | 5/2012 | Kamrat | ............... | G01K 1/16 |
| | | | | 374/163 |
| 2014/0023115 A1* | 1/2014 | Ueno | ............... | G01K 13/02 |
| | | | | 374/183 |
| 2020/0041034 A1* | 2/2020 | Chen | ............... | G05D 7/0635 |

FOREIGN PATENT DOCUMENTS

| | | | |
|---|---|---|---|
| DE | 3428913 | A1 | 10/1985 |
| EP | 0413198 | A1 | 2/1991 |
| FR | 1081980 | A | 12/1954 |
| FR | 2863705 | A1 | 6/2005 |

\* cited by examiner

SYSTEM FOR MEASURING THE TEMPERATURE OF A FLUID CIRCULATING IN A DUCT

TECHNICAL FIELD

The present invention relates to a system for measuring the temperature of a fluid circulating in a duct, for example a motor vehicle circuit duct. The present invention applies particularly to the measurement, by means of a temperature probe, of the temperature of a fluid circulating for example in a cooling circuit or in an air intake circuit and more specifically in a fuel supply circuit of gasoline or diesel type.

BACKGROUND

In a conventional manner, a temperature probe is provided with a heat-sensitive element connected to two electrically conductive output wires. This heat-sensitive element is, for example, of the temperature-sensitive electrical resistance type, generally surrounded by an epoxy or glass coating layer according to the electrical resistance technology which may be of the NTC (Negative Temperature Coefficient) type or the PTC (Positive Temperature Coefficient) type.

Generally, in the motor vehicle fuel supply circuits, it is desirable to avoid bringing the heat-sensitive element into direct contact with the fluid, in particular because of the risks of corrosion of the element, pollution of the fuel by materials constituting the heat-sensitive element, such as for example welding residues, or even because of electrical risks. It is thus known to cover the heat-sensitive element with a protective sheath, sometimes called a plunger. This sheath is generally provided with an extension in the shape of a glove finger housing the heat-sensitive element. The heat-sensitive element thus surrounded by this extension can penetrate as far as possible into the fluid whose temperature is to be measured, which allows a reliable measurement of the effective temperature of the fluid. This sheath is often made of a plastic or metallic material and assembled by crimping, by clipping or even directly integrated into the connector body.

In order to facilitate taking measurements in such a duct, a joint of a general T-shape has already been proposed to be inserted between two sections of the duct, this joint including an opening formed on its tubular wall through which the temperature probe penetrates into the flow path of the fluid to be controlled.

However, and particularly in the case of fuel supply circuits whose passage section of the fluid duct is very small, the glove finger, when positioned in the fluid passage, obstructs the duct and reduces the fluid passage section by generating disturbances in the fluid circulation, in particular by a significant pressure loss.

SUMMARY

The aim of the invention is to overcome these drawbacks and propose a measurement system allowing the plunger body to be submerged in the core of the fluid flow in order to optimize its temperature measurement reliability while limiting the disturbances in this flow.

To this end, the invention relates to a system for measuring the temperature of a fluid circulating in a duct, said system comprising:
a thermal probe comprising a heat-sensitive element,
a fluid-tight plunger body, shaped to completely wrap the heat-sensitive element of the probe,
a probe support comprising two orifices for joining the system to said duct, linked by an inner channel substantially axially extending in a main flow direction of the fluid in said support and comprising a radial opening through which the plunger body is configured to be at least partially submerged inside the inner channel,
characterized in that the inner channel is delimited by a tubular wall having an inner surface comprising a depression located facing the opening in order to limit singular pressure losses of the fluid likely to be generated by the presence of the plunger body in the fluid by defining a flow pathway of the fluid around the plunger body such that the flow of the fluid encountering the plunger body is diverted into the hollow relief of the depression in order to entirely bypass the plunger body.

Within the meaning of the present invention, a depression is a relief such as a recess or a hollow formed in the inner surface of the tubular wall.

In a manner known per se, pressure losses in a fluid flow are pressure drops caused by the resistance encountered by the flowing fluids. Particularly, a distinction is made between pressure losses called «linear» or «regular» pressure losses which correspond to the losses related to the flow along the ducts and the pressure losses called «singular» pressure losses which manifest on specific duct parts by modifying the direction or section of passage of the fluid. The presence of the plunger body in the passage section of the inner channel constitutes an obstacle which is likely to cause singular pressure losses.

Thanks to the depression, the fluid can flow around the plunger body in order to limit singular pressure losses. The function of this depressed region is to facilitate the circulation of the fluid around the plunger body in order, on the one hand, to limit singular pressure losses and, on the other hand, to promote the heat exchange with the fluid. Indeed, the presence of the depression allows completely immersing the end of the plunger body in the core of the flow path of the fluid to be controlled, the fluid flow encountering the plunger body, and particularly its end, being diverted into the hollow relief of the depression to bypass the plunger body around its end.

A temperature determination system may include either of the following characteristics of the invention.

For example, the depression is formed by a bowl of a substantially hemispherical general shape.

Preferably, the plunger body extends outside of and perpendicularly to the depression.

Preferably, the tubular wall has on an outer surface a spherical half-shell-shaped relief delimiting the depression of the inner channel.

Preferably, the outer surface comprises a peripheral stiffening rib extending at least around the spherical half-shell.

In a preferred embodiment, the probe support has a general T-shape comprising a plurality of branches defining a branching node and a stiffening structure of the branching node comprising a plurality of stiffening parts associated with each of the branches.

For example, the stiffening structure has a general U-shape.

In a preferred embodiment, the probe comprises a body of a general tubular shape made of plastic material and at least two contact tabs protruding from a proximal end of this body on which are fixed output terminals of the heat-sensitive/element, preferably formed of a thermistor.

In a preferred embodiment, the body of the probe is overmolded on the contact tabs or the tabs are forcefully mounted inside the probe body.

Preferably, the probe support comprises a tubular sleeve radially extending outwards from the radial opening, in order to form an assembly head of the temperature probe, to the probe support.

Preferably, the assembly head having a mouthpiece comprises a peripheral location of an O-ring seal in the proximity of its mouthpiece.

Preferably, the assembly head and the probe comprise complementary assembling means, for example of the snap-fitting, crimping, welding type, the plunger body being interposed between the head and the probe.

Preferably, the plunger body is independent of the probe and the probe support and is interposed between the probe support and the probe.

By dissociating the support, the plunger body and the probe functions, the system can be produced in large series with a simple and robust method because the three elements of the system are very simple in design and therefore are very simple to manufacture.

Furthermore, the fact of arranging the plunger body in a separate part allows more simply adjusting the depression in the probe support to allow, for example, maintaining a constant passage section for the fluid and compensating for the section loss linked to the presence of the plunger body. This could not be achieved with a probe support that would directly integrate the plunger body, for example by plastic injection, because the part would then be very difficult to unmold.

Preferably, the system comprises sealing means formed by an end bead of the plunger body.

Preferably, the heat-sensitive element comprises a heat-sensitive head and the plunger body comprises a terminal cavity shaped to conform to the shape of the heat-sensitive head.

In a preferred embodiment, the plunger body comprises a body of a general tubular shape open at one end and extending to the other end into a frustoconical tip terminating in a globally spherical cap shaped to house the sensitive head of the heat-sensitive element.

Preferably, the plunger body comprises a thickened open distal end in order to form a sealing lip, the plunger body being made of an elastomeric material.

BRIEF DESCRIPTION OF THE DRAWINGS

Other characteristics and advantages of the invention will become apparent in light of the description that follows, made with reference to the appended drawings in which.

DETAILED DESCRIPTION

Figure 1:
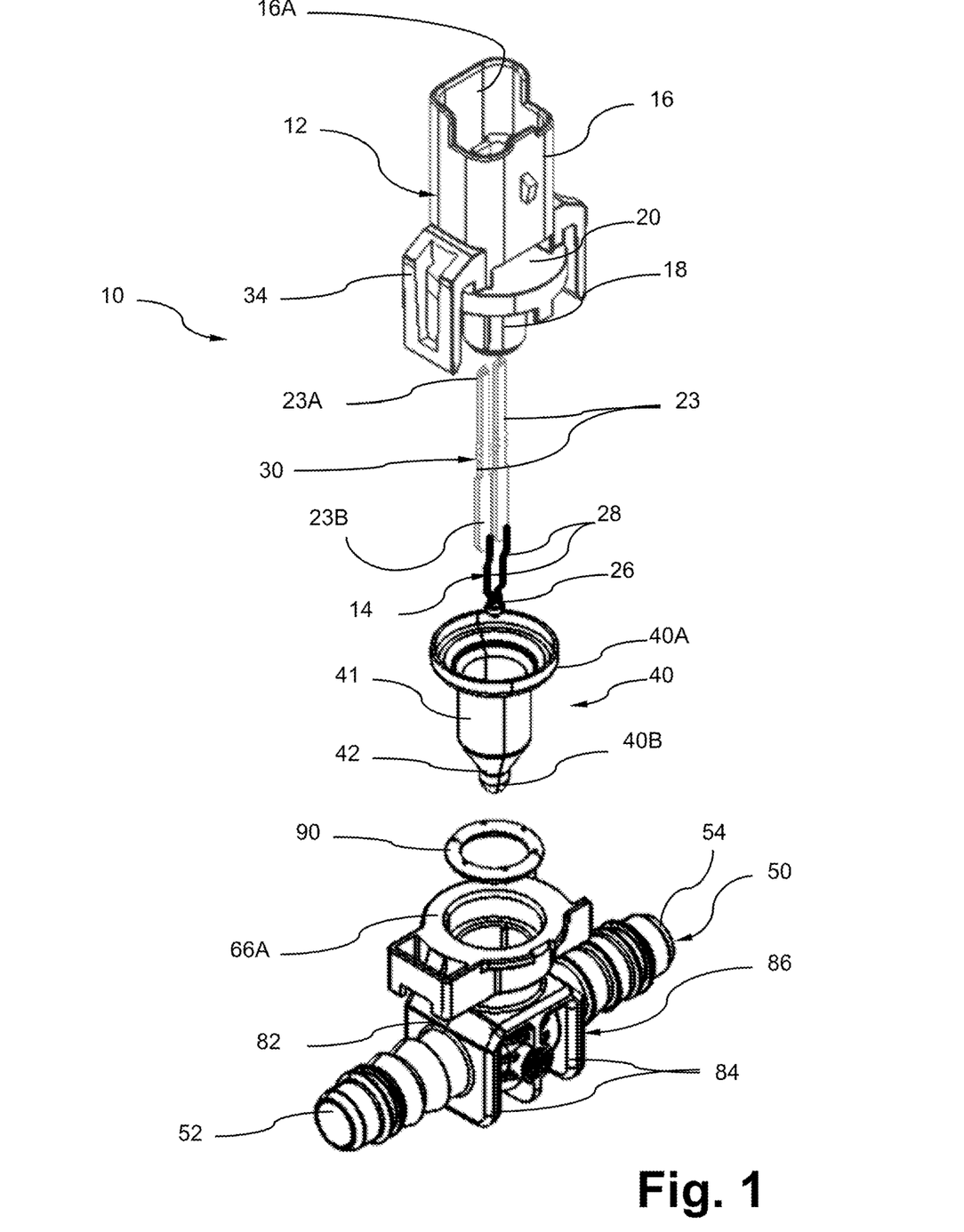
FIG. 1 is an exploded perspective front three-quarter view of a temperature determination system according to a first embodiment of the invention.
Figure 2:
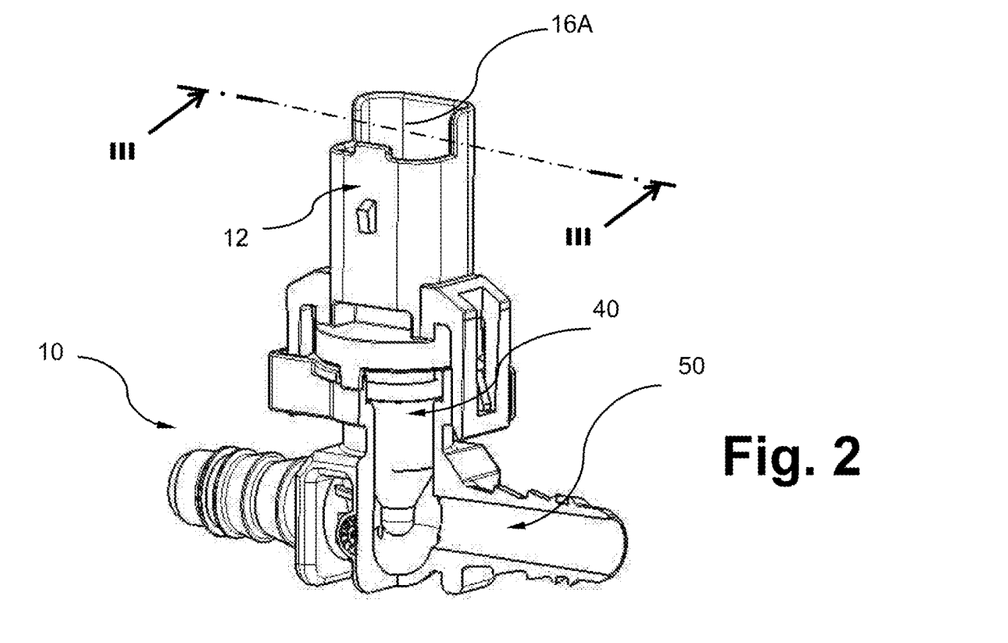
FIG. 2 shows a perspective and partial cutaway view of the system of FIG. 1.
Figure 3:
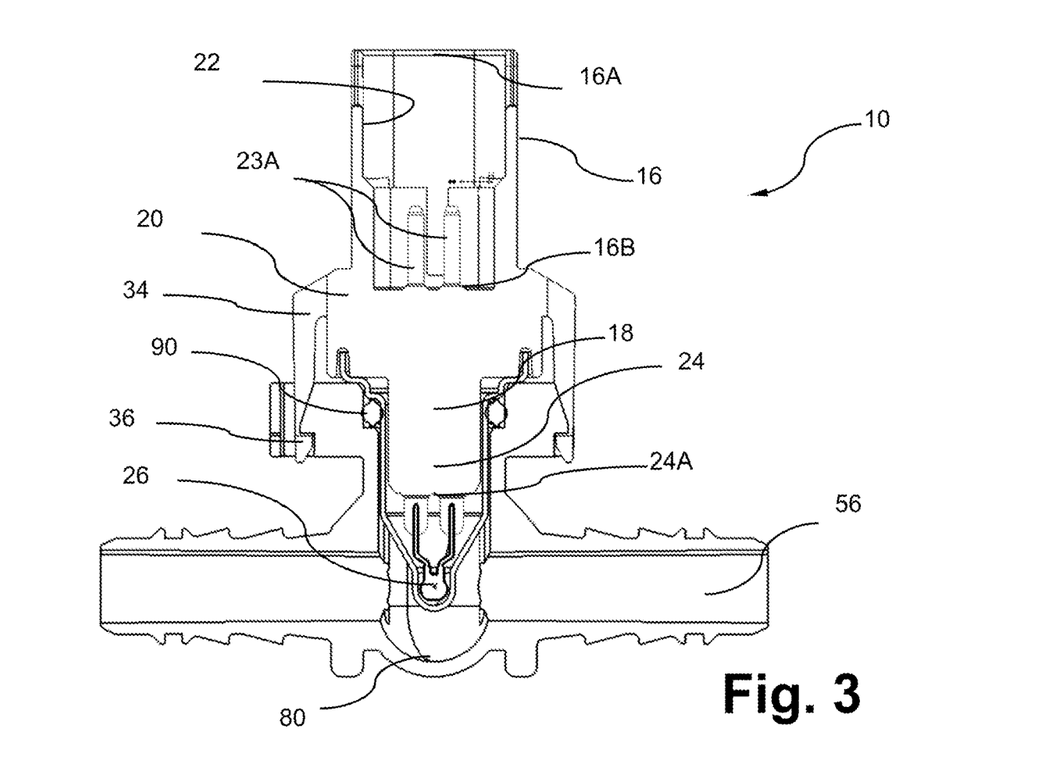
FIG. 3 shows a sectional view III-III of the system along a median plane passing through axes of the temperature determination system according to the first embodiment of the invention.

A temperature determination system is schematically shown in FIGS. 1 to 3 according to the invention. This system is designated by the general reference 10. This system 10 is configured to be mounted on a duct (not shown) in which a fluid circulates. For example, the duct is a motor vehicle circuit duct, such as a fuel circulation duct.

The system 10 is, for example, configured to be joined at one of its ends to a downstream duct section supplying fluid to the system 10 and at another of its ends to an upstream duct section to evacuate the fluid. To this end, the duct may be equipped with suitable junction means.

With reference to FIGS. 1 to 3, the system 10 in particular comprises a temperature probe 12 for determining a temperature of the fluid circulating in the duct. As illustrated in detail in FIG. 1, the thermal probe 12 comprises a heat-sensitive element 14, such as for example a thermistor.

Figure 4:
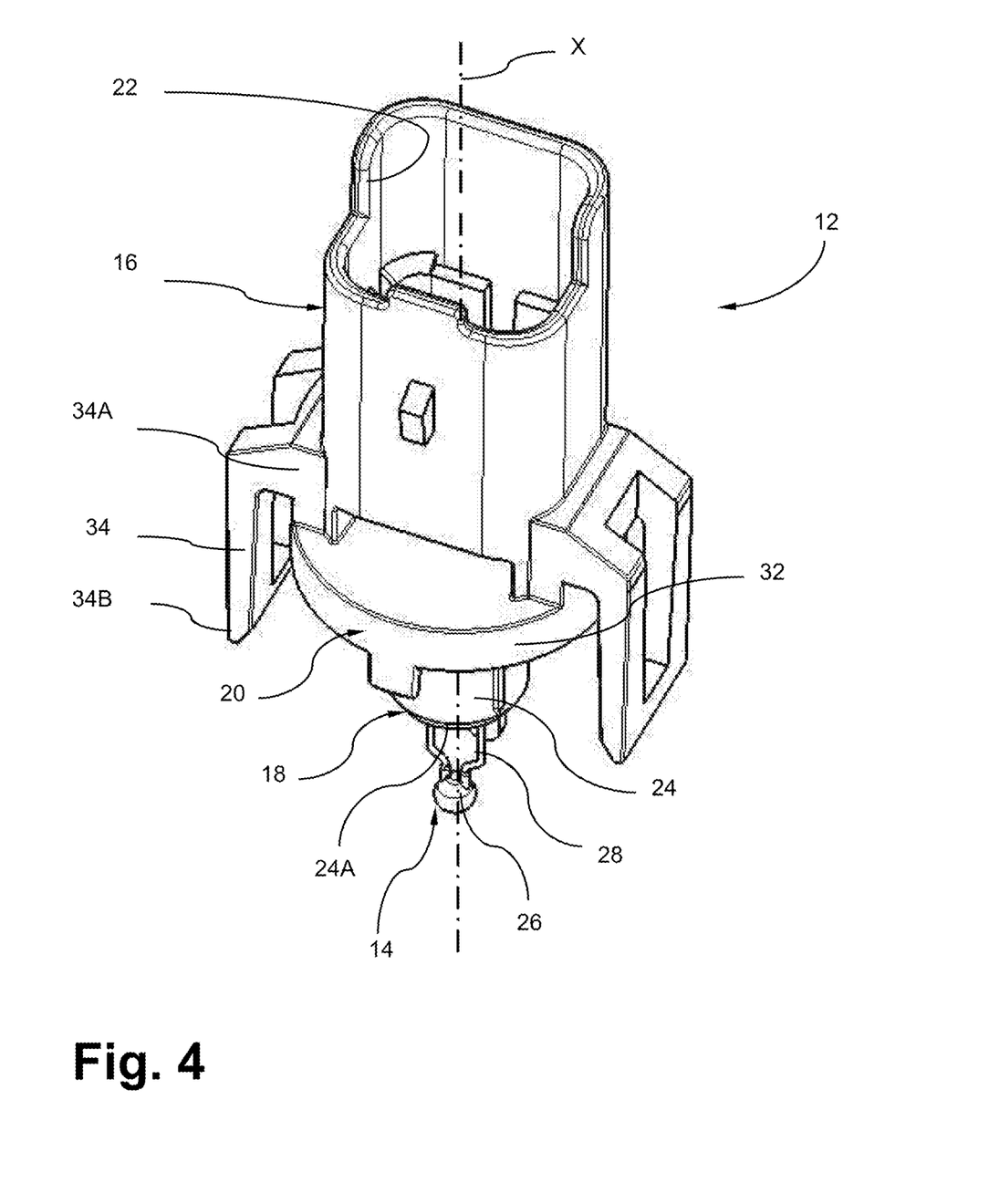
FIG. 4 shows a perspective view of a temperature probe of the system of FIG. 1.

Preferably, with reference to FIG. 4, the probe 12 comprises a body of a general tubular shape longitudinally extending along an axis X and comprises at least one distal end segment 16 for electrical connection and one proximal end segment 18 for measurement. In this example, the probe 12 also comprises an intermediate segment 20 extending between the distal segment 16 and the proximal segment 18 configured to be fixed to a support detailed below.

Within the meaning of the present description, an element will be referred to as proximal or distal depending on whether it is axially near or far from the measurement area.

Preferably, the distal connection segment 16 is shaped to allow the electrical junction of the measurement system 10 with an external electrical circuit such as for example an electrical control unit of the motor vehicle (not shown). In this example, the distal connector segment 16 is in the shape of a hollow body 22 of a general tubular shape open at a distal end 16A and having at a closed proximal end 16B at least one electrical connector element 23A protruding inside the body 22 to form a socket (visible in FIG. 3). The hollow body 22 is for example shaped to cooperate with an electrical connection element (not shown) electrically joined to the electrical control unit of the motor vehicle.

Furthermore, as can be seen in FIG. 4, the measurement segment 18 is formed by a tubular tip 24 of a general cylindrical shape provided with a front face 24A from which extends the heat-sensitive element 14.

In the described example and preferably, the heat-sensitive element 14 comprises a heat-sensitive head 26 supported by two electrically conductive output wires 28 connected to the head 26 on a same side of the latter. The head 26 has a first side to which the output wires 28 are connected and a second side forming its free end, of a rounded shape in this case. The two wires 28 are preferably rigid or semi-rigid to perform a structural support function with respect to the head 26, the head 26 being held only by the wires 28.

This heat-sensitive element 14 is for example a temperature-sensitive electrical resistance, of the NTC (acronym for «Negative Temperature Coefficient») type or of the PTC (acronym for «Positive Temperature Coefficient») type, this electrical resistance can be surrounded by a coating layer, made of epoxy or glass for example.

The two distal 16 and proximal 18 segments are for example electrically interlinked by electrical connection means 30. To this end, the electrical connection means 30 comprise metal pins 23 extending axially between the distal segment 16 and the proximal segment 18. These pins 23 are formed by metal contact tabs which can be overmolded in the body of the temperature probe 12 or even forcefully mounted inside the body of the temperature probe 12 such that the distal end 23A of the contact tabs is accessible from the inside of the hollow housing of the connector portion to form the pins 23 and that the proximal end 23B protrudes from the front face 24A of the proximal tip 24 in order to be joined to the heat-sensitive element 14.

Preferably, in the described example, the body of the probe 12 is made for example of a rigid or semi-rigid plastic material. For example, the body of the probe 12 is made of a polymeric material such as for example an aliphatic polyamide selected from the group consisting of PA6, PA66, PA11, PA12, and/or mixtures and/or copolyamides thereof or else a thermoplastic selected from polyetheretherketone (PEEK), polybutylene terephthalate (PBT) or else a polyphtalamide (PPA) or else phenylene polysulfide (PPS). It may be filled with glass fibers, mineral fillers or any other filler allowing achieving the required mechanical, resistance or dimensional stability characteristics.

Furthermore, in this example, the heat-sensitive element 14 is assembled on the proximal end 23B of the contact tabs 23. For example, the output wires 28 of the heat-sensitive element 14 are connected, by electrical or ultrasonic welding, directly on the pins 23 of the measurement probe 12 by means for example of two spots of electrical or ultrasonic welding with one welding spot per output wire.

Thus, the blades or pins 23 support the output wires 28 and therefore the heat-sensitive element 14 which is at a distance, carried in cantilever from the proximal tip 24 of the measurement segment 18 of the probe 12.

In this example, the heat-sensitive element 14 comprises, for example, a thermistor of the Negative Temperature Coefficient type, or of the Positive Temperature Coefficient type, or of the PT100 or PT1000 platinum elements type. The head 26 is electrically connected to the two wires 28 which are electrically linked to the connector portion 16 of the support of the probe 12 by the metal contact blades or pins 23 for transmitting the measurement signals. More precisely in this case, and in a known manner, the head 26 is a part of an electrical circuit in which the resistance is measured at its terminals, from which the temperature of the fluid is deduced, since the resistance of the head 26 directly depends on the temperature to which it is exposed, that is to say, since it is arranged in the main flow area of the fluid, on the fluid temperature.

The intermediate segment 20 for fixing the probe 12 comprises in this example a base 32 forming a shoulder with the measurement tip 24. This base 32 has a general disc shape. The intermediate segment 20 also comprises in this example at least two elastically deformable lugs 34 extending substantially parallel to the longitudinal axis X of the probe 12 and diametrically opposite relative to the axis X. Each snap-fitting lug 34 comprises at its free proximal end 34B an inwardly protruding spigot 36 (FIG. 3). As visible, in particular in FIGS. 1, 3 and 4, the snap-fitting lugs 34 are also open-worked. In the illustrated example, the snap-fitting lugs 34 have a general rectangular shape having a rectangular central opening. The snap-fitting lugs 34 each comprise a distal end 34B mounted and fixed on the base 32.

When the temperature probe 12 is engaged inside a fluid circulation duct, the measurement tip 18 is configured to be inserted into an access opening to the flow path of fluid in order to control its temperature by means of the heat-sensitive element 14.

Figure 8:
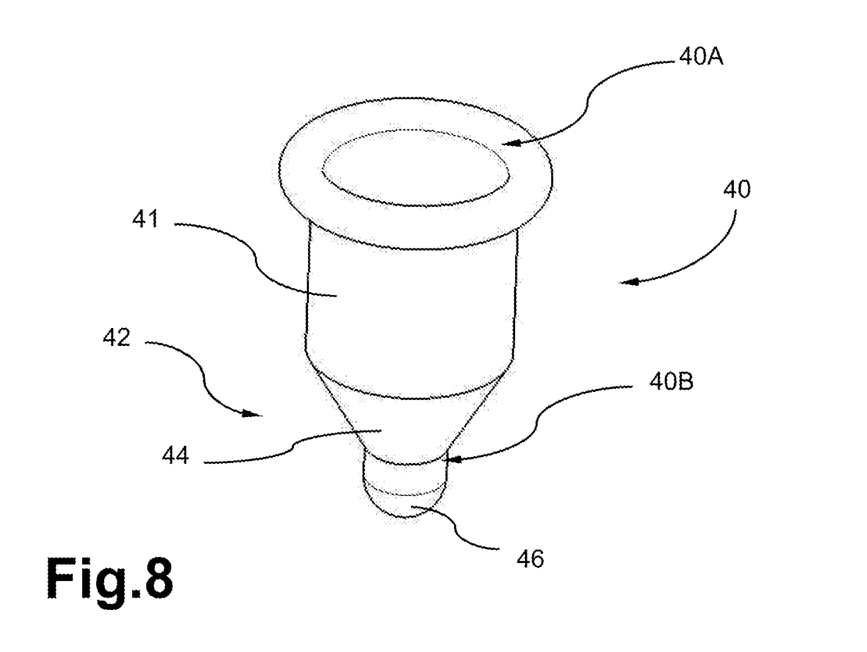
FIG. 8 shows a perspective view of a plunger body of the determination system of FIG. 7.

According to the invention, the heat-sensitive element 14 is isolated from the fluid contained in the duct by a plunger body 40 illustrated in detail in FIG. 8. The plunger body 40 is shaped to completely wrap the heat-sensitive element 14 of the probe 12. This plunger body 40 is preferably made of a metallic material or of a plastic material. Preferably, the plunger body 40 is made of a plastic material.

For example, the plunger body 40 is made of a rigid or semi-rigid polymeric material such as an aliphatic polyamide selected from the group consisting of PA6, PA66, PA11, PA12, and/or mixtures and/or copolyamides thereof or else a thermoplastic selected from polyetheretherketone (PEEK), polybutylene terephthalate (PBT) or else a polyphtalamide (PPA) or else phenylene polysulfide (PPS). It may be filled with glass fibers, mineral fillers. Particularly, these fillers can improve the thermal conduction of the thermoplastic, such as graphical fillers. Alternatively, the plunger body may be made of a material such as stainless steel or aluminum.

Preferably, in the described example, the plunger body 40 comprises a body 41 of a general tubular shape open at a first distal end 40A and extending to a second proximal end 40B into a frustoconical tip 44 terminating in a globally spherical cap 46 to house the sensitive head 26 of the heat-sensitive element 14 delimiting the terminal housing 42. The tubular body 41 is configured to wrap the tip 24 of the probe 12 and the frustoconical tip 44 is configured to house the electrical connection wires 28 of the heat-sensitive element 14.

With this conformation, the frustoconical extension of the plunger body 40 penetrates as far as possible into the fluid whose temperature is to be measured, which allows a reliable measurement of the effective temperature of the fluid.

Optionally, in particular in order to improve the thermal coupling, the heat-sensitive element 14 is housed inside the frustoconical extension of the plunger body 40 with a thermally conductive casting mass. In addition to improving the thermal coupling, this material has a function of maintaining the sensitive head 26 of the heat-sensitive element 14 during mounting. The casting mass is for example a thermally conductive paste. Indeed, in order to limit contact between the heat-sensitive element 26 and the inner wall of the plunger body 40 while improving the thermal coupling, preferably the plunger body 40 is generally filled with a thermal coating paste in order to immobilize the thermistor and fill the voids between the sensitive element 14 and the inner wall of the plunger body 40.

The system 10 further comprises a probe support 50 for receiving the fluid circulating in the duct whose temperature is to be controlled. This probe support 50 is formed, as seen in FIGS. 1 and 2 and in more detail in FIG. 3, of a main tubing.

In this example, the probe support 50 comprises two orifices 52 and 54 for joining the system 10 to said duct, linked by an inner channel 56 axially extending in a main flow direction of the fluid.

Figure 5:
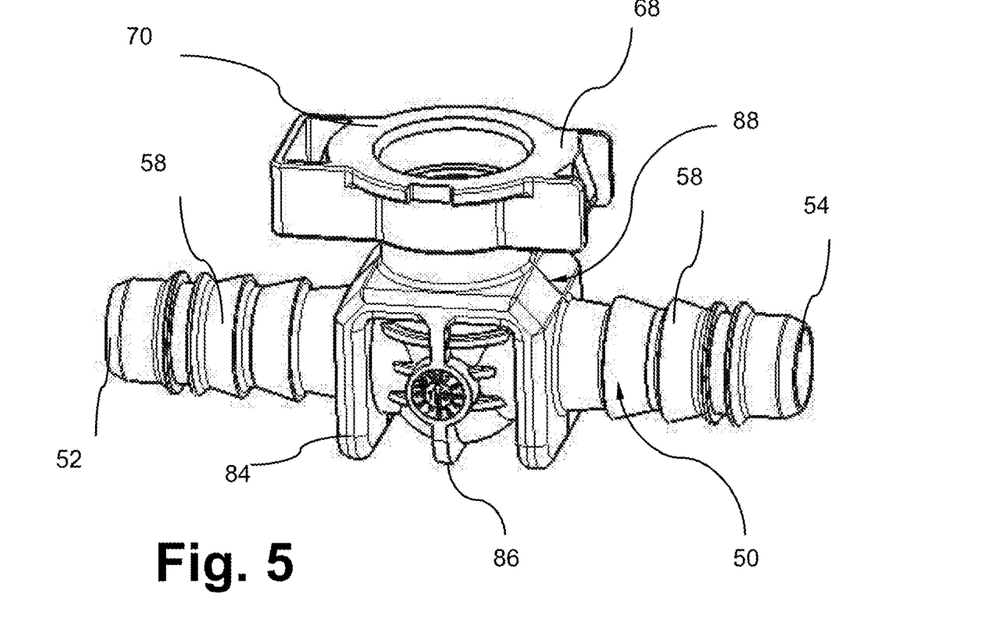
FIG. 5 is a perspective view of a probe support of the system of FIG. 1.
Figure 6:
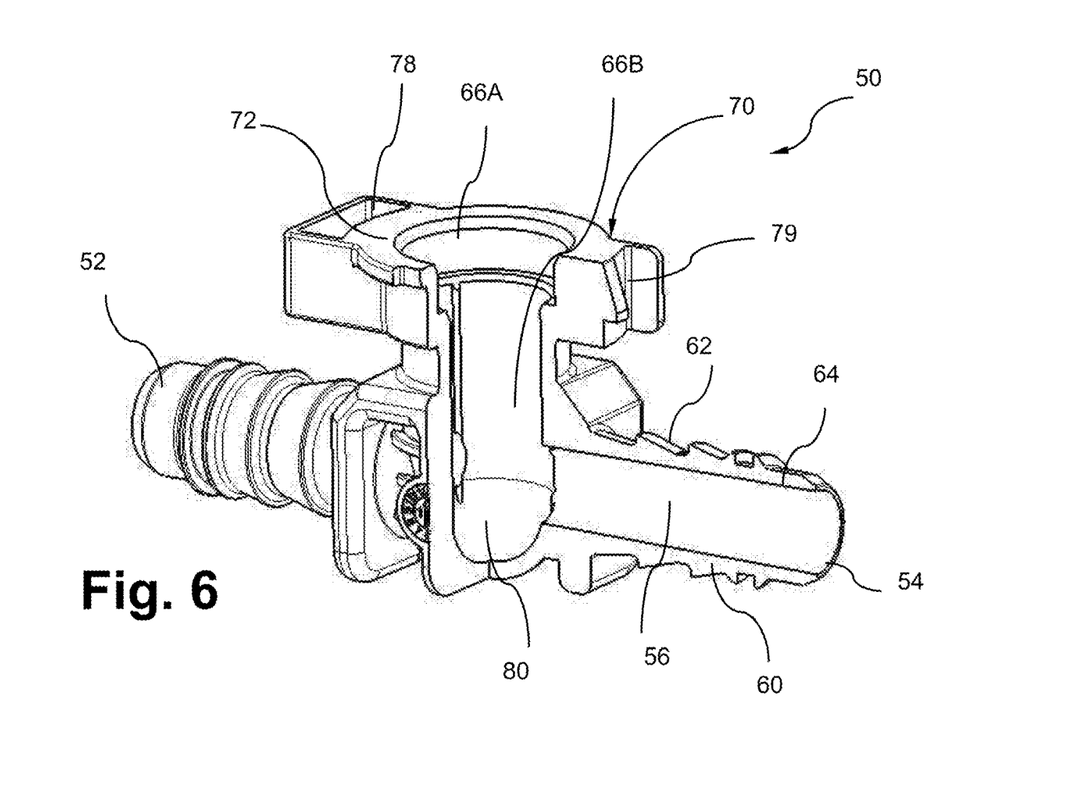
FIG. 6 is a partial cutaway view of the probe support of FIG. 5.

This probe support 50 comprises, in the example illustrated by FIGS. 5 and 6, two tubular tips 58 at the end of which are located the ends of junction 52 and 54 to the duct. These tubular ends 58 are, in this example, notched to facilitate the fluidic junction to the main duct (not shown). The inner channel 56 is, in the described example, delimited by a tubular wall 60 having an outer surface 62 and an inner surface 64.

The probe support 50 comprises according to the invention a proximal radial opening 66B opening inside the inner channel 56. The plunger body 40 is configured to be at least partially submerged inside the inner channel 56 through this proximal opening 66B.

The probe support 50 is provided, on its outer surface, with a sleeve 68 for example of a general cylindrical shape radially extending outwards from the radial opening 66B, in order to form an assembly head 70 of the temperature probe 12 and the plunger body 40, to the probe support 50 delimiting a distal radial opening 66A.

This assembly head 70 is preferably provided with complementary means for centering and/or fixing the temperature probe 16 to the probe support 50. The complementary fixing means of the probe 12 and the probe support 50 can be the subject of numerous variants. Preferably, in the described example, the complementary fixing means comprise elastic snap-fitting means.

To this end, preferably, the assembly head 70 comprises at its mouthpiece a flange 72 protruding radially from its distal opening contour 66A. This flange 72 preferably comprises a slit 78 for receiving one of the snap-fitting lugs to elastically receive it and a receiving notch 79 for receiving the other snap-fitting lug. It will be understood that these fixing means may comprise other shapes without departing from the scope of the invention.

More particularly, the inner channel 56 comprises on the inner surface 64 of its wall 60 a depression 80 located facing the opening 66 of passage of the probe 16 in order to limit singular pressure losses of the fluid likely to be generated by the presence of the plunger body by defining a flow pathway of the fluid around the plunger body 40.

In order to limit these losses, the invention thus proposes to shape the inner flow channel 56 by forming a depression 80 perpendicularly to the radial opening 66B through which the plunger body 40 submerges.

Preferably and as illustrated in FIG. 3, the depression 80 is formed by a bowl of a substantially hemispherical general shape. In the example illustrated for example in FIG. 3, the depression 80 gives the outer surface of the probe support 50 a domed aspect on its outer surface. Preferably, the depression 80 comprises an axial section in the general shape of a circular arc.

In the embodiment illustrated in the figures, in which the plunger body 40 extends outside of and perpendicularly to the depression 80. Furthermore, as illustrated in FIG. 3, a lower end of the plunger body 40 substantially extends in a position axially centered inside the inner channel 56.

Moreover, in the described example, the probe support 50 has a general T-shape comprising a plurality of branches formed by the measurement head 70 and the two tubular tips 58. This plurality of branches defines a branching node 82 comprising a plurality of stiffening parts 84 associated with each of the branches. For example, the plurality of stiffening parts 84 forms a stiffening structure 88 extending locally to the branching 82.

In the illustrated example, the stiffening structure 88 has a general U-shape delimiting stiffening wings 84 on each of the branches shaped as a planar wall. Moreover, the probe support region comprising the depression 80 extends inside the branching node 82. For example, the stiffening structure further comprises in this example a central rib 86 extending over the entire outer periphery of the depression area 80 of the support 50.

Furthermore, as visible in FIGS. 1 to 6 illustrating the first embodiment, the measurement system 10 further comprises an O-ring seal 90. This O-ring 90 is configured to be inserted inside an annular groove formed in an inner wall of the flange 72 of the assembly head 70, as visible in FIG. 3.

Moreover, the plunger body 40 has in this embodiment a distal end 40A configured to be axially fixed inside the intermediate portion 20. The plunger body 40 delimits with the probe support 50 the annular groove for receiving the seal 90. Furthermore, the plunger body may include peripheral spaces for housing at least one seal. As illustrated in FIG. 1, the plunger body 40 is externally provided, at the distal end 40A, with an annular shoulder in which a peripheral groove or slot is formed. Furthermore, in the illustrated example, the distal end 40A of the plunger body 40 is provided with an axial extension configured to cooperate with the probe support 50 and the probe 12 in order to be held inside the probe 12 for example in a peripheral complementary axial slit.

Figure 7:
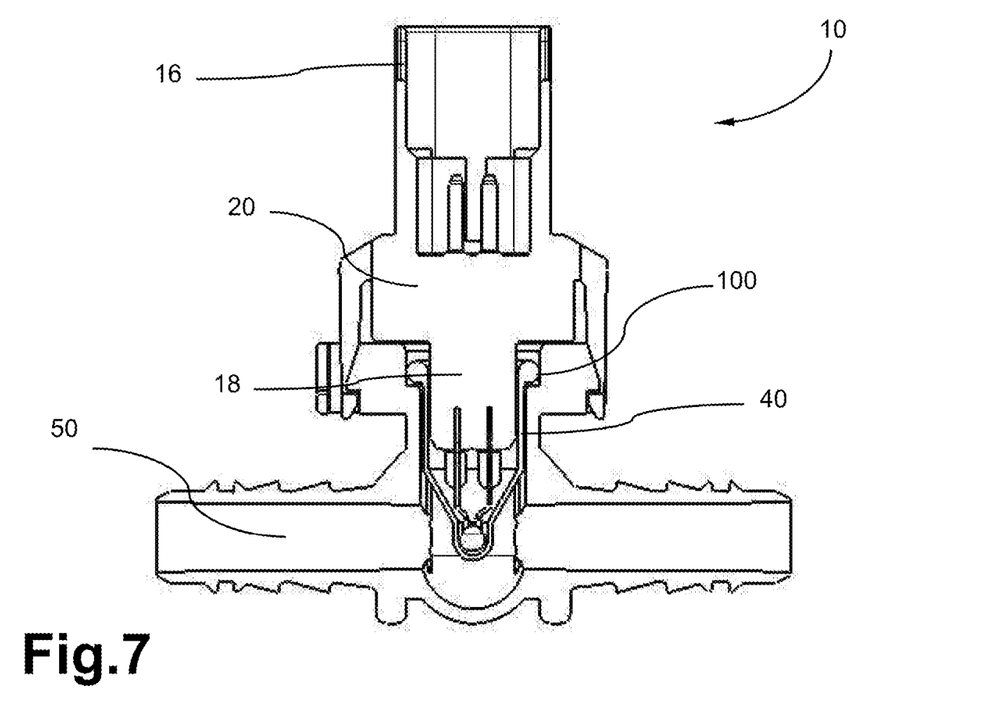
FIG. 7 shows a sectional view of a temperature determination system according to a second embodiment of the invention.

A determination system is shown in FIGS. 7 and 8 according to a second embodiment. In this second embodiment, elements similar to those of the first embodiment bear identical references.

In this second embodiment, the plunger body 40 is made of an elastomeric material such as for example:
  fluorosilicone for example in the case of a probe configured to measure the temperature in fuel circuits;
  EPDM rubber (acronym for ethylene-propylene-diene monomer) for example in the case of cooling or SCR circuit,
  other polymeric materials, for example NBR («nitrile butadiene rubber»), hydrogenated nitrile rubbers (acronym HNBR «hydrogenated nitrile butadiene rubber»), fluorinated elastomers of the FKM («fluorine rubber») type, ethylene methyl acrylate (EMA).

In the case of elastomer use, the pressure internal to the fluid circuit may then allow applying the flexible material of the plunger body against the heat-sensitive element 14 of the probe 12 and the use of a thermal paste can in this case be unnecessary.

Furthermore, in order to evacuate the air contained in the plunger body, the probe 12 may preferably comprise an aeration vent. Thus, the probe 12 may comprise a small orifice forming an aeration channel. Optionally, alternatively, the probe can be ventless, the air can thus be compressed and its volume can be greatly reduced inside the plunger body.

It will be noted that, depending on the design of the plunger body 40, on the material and the thicknesses used, using an elastomeric material to make the plunger body may alternatively allow achieving the sealing directly by the plunger body without using additional seals. It is possible to provide this sealing function by adjusting the geometry and the material thicknesses. The compression of the plunger body 40 interposed between the probe support 50 and the probe 12 allows guaranteeing the sealing in a radial and/or axial manner.

To this end, as illustrated in FIG. 8, the plunger body 40 comprises at its distal end 40A a peripheral bead 100 around its opening 40A in order to form a seal integrated to the plunger body 40.

The main operating aspects of a determination system according to the two embodiments of the invention will now be described.

During the temperature measurement, the probe support 50 is attached on a fluid circulation duct by joining the two sections of the duct on the junction tips 58 provided for this end on the probe support 50. The plunger body 40 housing at its proximal end 40B the heat-sensitive element 14 is positioned such that the proximal end 40B extends to the center of the fluid flow pathway in order to obtain reliable temperature measurements. The disturbances induced by the presence of the plunger body 40 in the fluid flow pathway are limited thanks the probe support 40 according to the invention. Indeed, the depressed area 80 of the probe support 50 allows the fluid to bypass the plunger body 40 and thus limit the pressure losses.

Of course, the invention is not limited to the embodiments previously described. Other embodiments within the reach of those skilled in the art can also be considered without departing from the scope of the invention defined by the claims below.

The invention claimed is:

1. A system for measuring a fluid temperature, said system comprising:
   a thermal probe comprising a heat-sensitive element,
   a fluid-tight plunger body, shaped to completely wrap the heat-sensitive element of the thermal probe, and
   a probe support comprising two orifices for joining the system to a duct in which the fluid circulates, and an inner channel linking the two orifices and substantially axially extending in a main direction of a fluid flow, the inner channel comprising a radial opening through which the plunger body is configured to be at least partially submerged inside the inner channel,
   wherein the inner channel is delimited by a tubular wall having an inner surface comprising a depression facing the radial opening and forming a hollow relief in order to limit singular pressure losses likely to be generated by the plunger body in the fluid flow by defining a fluid flow pathway around the plunger body such that the fluid flow encountering the plunger body is diverted into the hollow relief in order to entirely bypass the plunger body.

2. The system according to claim 1, wherein the depression is formed by a bowl of a substantially hemispherical general shape.

3. The system according to claim 1, wherein the plunger body extends outside of and perpendicularly to the depression.

4. The system according to claim 1, wherein the plunger body is independent of the thermal probe and the probe support and is attached between the probe support and the thermal probe.

5. The system according to claim 1, further comprising sealing means formed by an end bead of the plunger body.

6. The system according to claim 1, wherein the plunger body comprises a thickened open distal end in order to form a sealing lip, the plunger body being made of an elastomeric material.

7. The system according to claim 1, wherein the tubular wall has on an outer surface a spherical half-shell shaped relief delimiting the depression of the inner channel.

8. The system according to claim 7, wherein the outer surface is provided with a peripheral stiffening rib extending at least around the spherical half-shell.

9. The system according to claim 1, wherein the probe support has a general T-shape comprising a plurality of branches defining a branching node and a stiffening structure of the branching node comprising a plurality of stiffening parts associated with each of the branches.

10. The system according to claim 9, wherein the stiffening structure has a general U-shape.

11. The system according to claim 1, wherein the heat-sensitive element comprises a heat-sensitive head and the plunger body comprises a terminal cavity shaped to conform to the shape of the heat-sensitive head.

12. The system according to claim 11, wherein the plunger body comprises a body of a general tubular shape open at one end and extending to the other end into a frustoconical tip terminating in a globally spherical cap shaped to house the sensitive head of the heat-sensitive element.

13. The system according to claim 1, wherein the thermal probe comprises a probe body of a general tubular shape made of plastic material and at least two contact tabs protruding from a proximal end of the probe body on which are fixed output terminals of the heat-sensitive element.

14. The system according to claim 13, wherein the probe body is overmolded on the contact tabs or the contact tabs are forcefully mounted inside the probe body.

15. The system according to claim 13, wherein the heat-sensitive element is formed of a thermistor.

16. The system according to claim 1, wherein the probe support comprises a tubular sleeve radially extending outwards from the radial opening, in order to form an assembly head of the thermal probe, to the probe support.

17. The system according to claim 16, wherein the assembly head includes a mouthpiece and a peripheral location of an O-ring seal in the proximity of the mouthpiece.

18. The system according to claim 16, wherein the assembly head and the thermal probe comprise complementary fixing means.

19. The system according to claim 18, wherein the complementary fixing means is a snap-fitting fixing means.

* * * * *